Patented Sept. 12, 1944

2,357,927

UNITED STATES PATENT OFFICE 2,357,927

EMULSION PRINTING INK

James Raymond Berg, Chicago, Ill.

No Drawing. Application July 24, 1940,
Serial No. 347,148

11 Claims. (Cl. 106—20)

My invention relates to emulsion inks and is particularly concerned with improvements in such inks whereby products of unusual efficacy and low cost may readily be produced.

Emulsion inks, which, in general, comprise an emulsion containing a varnish, water and pigments, have heretofore been suggested but, to my knowledge, none of them has come into any substantial use because of the various disadvantages which they suffered. Thus, for example, the inks were unstable and, after a short period of time, the water separated from the varnish phase and produced a non-homogeneous product whose printing characteristics were seriously impaired. Even in the situation where such inks had not undergone emulsion breakdown and resulting water separation, their printing qualities or characteristics were unsatisfactory. Furthermore, after a relatively short period of time, a surface film or skin formed over the body of the ink which prevented proper handling and feeding on the presses. Numerous other disadvantages characterized such inks which militated against their use despite the fact that a satisfactory ink of this type offered certain marked advantages over the usual printing inks of the non-emulsion type or the straight varnish-oil vehicle inks.

In an effort to solve the problem at least in part, it has recently been proposed to produce emulsion inks from colored pigment pulps, that is, colored pigments in the form of pulps containing upwards of about 70% water. Aside from the fact that this proposal has no applicability to the production of black inks containing the usual carbon pigments, even as to colored inks the results leave much to be desired. Thus, for example, the water phase tends to separate and the inks skin over on standing for relatively short periods of time.

In accordance with my invention, emulsion inks are produced which are markedly superior to any inks of this type which have been heretofore known so far as I am aware. These inks are not only substantially cheaper in cost than the conventional straight varnish-oil vehicle types, but they possess numerous other advantages. Thus, for example, their printing characteristics are at least as good and, in many cases, better than the inks heretofore produced and costing substantially more in price. The inks made in accordance with my invention are free from the tendency to form a skin on the surface thereof even over relatively long periods of time. They do not dry on the press over periods as long as sixteen hours and in some cases over still longer periods of time. They dry rapidly on enameled stock paper, in some cases in ¼ to ⅓ the time required for standard inks. They print excellently on ordinary "Cellophane." The inks made in accordance with my invention may be made so that they dry either by oxidation or by evaporation by heating. They do not affect the glue-glycerin rollers found on many printing presses. Whereas emulsion inks heretofore prepared break down upon freezing with the separation therefrom of the water phase, at least most of the inks made in accordance with my invention will withstand freezing temperatures without any deleterious effect upon the appearance of the ink or the printing characteristics thereof. The inks made in accordance with my invention, furthermore, possess excellent non-rub properties and, in addition, they withstand the solvent action of molten paraffin. Still other advantages emanate from the inks of my invention which will be brought out by the following detailed description.

In general, the emulsion inks of my invention contain the usual varnish, water and pigments but, in addition thereto, they include magnesium carbonate, known in the printing trade as "magnesia," and agents which I characterize as colloidal agents and emulsifying agents. I have found it to be essential, in order to produce fully satisfactory results, to use, in combination, a so-called colloidal agent, emulsifying agent and magnesium carbonate together with the varnish, water and pigments. I have not been able to ascertain fully the mechanism of the coaction of these ingredients but extensive experiments have shown the necessity for their presence in order to produce inks of fully satisfactory characteristics.

The following examples are illustrative of emulsion inks made in accordance with my invention. It will be understood that these examples are in no way limitative of the full scope of my invention. Various changes may be made therein with respect to the proportions of ingredients, selection of varnishes, the employment of supplemental agents such as toners and the like, the utilization of different pigments or mixtures of pigments, and the like. These and other changes will be apparent to those skilled in the art in the light of the guiding principles which I have disclosed herein. The ingredients are listed in parts by weight.

*Example 1—Black printing ink*

| | |
|---|---|
| Carbon black | 16.19 |
| Methyl violet toner | 2.86 |
| Magnesium carbonate | 2.86 |
| Polyvinyl alcohol | 0.95 |
| "MPD–189"[1] | 0.95 |
| Water | 16.19 |
| Varnish A[2] | 57.15 |
| Varnish B[2] | 2.85 |

[1] "M P D 189" is an emulsifying agent sold in the trade as such and comprising "sulfonated" chlorinated hydrocarbons.
[2] Varnish A comprised a mixture of equal parts of Zitro zinc resinate and high fraction kerosene. Varnish B contained 40 parts by weight of gilsonite and 60 parts by weight of high fraction kerosene.

The methyl violet toner was added to the mixture of varnishes, the polyvinyl alcohol and "MPD 189" were added and mixed therewith, the water was then added with mixing, the magnesium carbonate was then added and mixed with the aforementioned ingredients and, finally, the carbon black was added in graduated proportions while thoroughly mixing. The resulting mixture was then milled three times in a conventional ink mill.

This ink had excellent printing characteristics and, when tested, on a high speed Miehle Vertical press, showed no effect whatever on the glue-glycerin rollers. After a period of three and one-half months, the ink showed no signs of skinning or separation.

*Example 2—Black printing ink*

| | |
|---|---|
| Carbon black | 16.83 |
| Alkali blue | 2.97 |
| Magnesium carbonate | 2.97 |
| Rayon Size MW [1] | 0.99 |
| MPD 189 | 0.99 |
| Water | 14.85 |
| Cobalt linoleate | 1.98 |
| Varnish A | 28.72 |
| Linseed oil (medium) | 29.70 |

[1] Rayon Size MW is a methyl methacrylate resin.

This ink was prepared in the same way as was the ink of Example 1 with the exception that the cobalt linoleate, namely, the drier, not present in Example 1, was added preliminarily to the varnish which comprised the mixture of varnish A and linseed oil. This ink had properties similar to the ink of Example 1. As illustrative of the economy in production, based on a 500 pound batch, the cost of the ink of this example was 6¢ per pound as against 10¢ per pound for a conventional black ink.

*Example 3—Orange printing ink*

| | |
|---|---|
| Persian orange | 20.00 |
| Graphic red | 9.17 |
| Magnesium carbonate | 4.76 |
| Polyvinyl alcohol | 0.95 |
| MPD 189 | 0.95 |
| Water | 19.05 |
| Cobalt linoleate | 1.90 |
| Linseed oil (medium) | 24.75 |
| Varnish E-4 [1] | 5.19 |
| Varnish A | 13.28 |

[1] Varnish E-4 was made by mixing 65 parts by weight of "Amberol F 7" with 35 parts by weight of high fraction kerosene.

The ink mixture was milled four times. The resulting product, although slightly heavy in body, had excellent printing characteristics. It may be cut back with kerosene to any desired consistency.

*Example 4—Black newspaper ink*

| | |
|---|---|
| Carbon black | 12.60 |
| Magnesium carbonate | 2.00 |
| MPD 189 | 1.00 |
| Tannic acid | 1.00 |
| Varnish B-3 [1] | 10.00 |
| Mineral oil (heavy) | 15.00 |
| Mineral oil (light) | 20.40 |
| Water | 15.00 |

[1] Varnish B-3 was made by mixing equal parts by weight of gilsonite and heavy mineral oil.

The ingredients listed here were mixed in the manner indicated in Example 1 and then milled. There were then added the following:

| | |
|---|---|
| Methyl violet toner | 1.00 |
| Mineral oil (light) | 10.00 |
| Kerosene (light) | 10.00 | and thoroughly mixed into the previously milled composition. The indicated manner of compounding the ink was employed and the proportions were utilized in order to produce a product with a viscosity comparable to ordinary printing inks.

The ink of this example surpassed conventional newspaper inks in all material respects, notably with regard to rub and penetration properties.

*Example 5—Red printing ink*

| | |
|---|---|
| Red lake C | 37.6 |
| French talc | 4.0 |
| Cobalt linoleate | 4.0 |
| Magnesium carbonate | 10.4 |
| "Ninol" X [1] | 10.0 |
| Varnish E [1] | 86.0 |
| Water | 48.0 |

[1] "Ninol" X is a product resulting from the condensation of two mols of diethanolamine with one mol of stearic acid, produced as described in Patent No. 2,089,212. Varnish E comprised 40 parts by weight of "Amberol F 7" and 60 parts by weight of high fraction kerosene.

The resulting ink composition was milled three times and then cut with 15% of high fraction kerosene. The ink had good printing characteristics and did not skin even when exposed to the air for a substantial period of time.

*Example 6—Red news ink*

| | |
|---|---|
| Mineral oil (light) | 24.60 |
| Cobalt linoleate | 1.58 |
| Linseed oil (light vis.) | 16.59 |
| Linseed oil (body gum) | 3.86 |
| MPD 189 | 0.8 |
| Polyvinyl alcohol | 0.8 |
| Water | 19.76 |
| Magnesium carbonate | 3.16 |
| Graphic red | 19.76 |
| Kerosene | 9.09 |

The ink composition was milled three times. Its body was slightly heavy for a news ink but it may be cut with kerosene to the desired consistency without any adverse effect upon its printing characteristics. The ink did not skin over and had good printing properties.

*Example 7—Red bread wrapper ink*

| | |
|---|---|
| Barium lithol red | 11.8 |
| Calcium lithol red | 4.0 |
| French talc | 5.0 |
| Cobalt linoleate | 2.0 |
| Magnesium carbonate | 5.2 |
| Tannic acid | 1.0 |
| MPD 189 | 1.0 |
| Water | 25.0 |
| Varnish [1] | 45.0 |

[1] The varnish was made up of 65 parts by weight of Rezyl 17 and 35 parts by weight of high fraction kerosene.

The ink composition was milled three times. The resulting ink had excellent properties in all respects. On standing open to the atmosphere, the ink did not skin over and even after a period of three and one-half months there was no sign of skinning over or separation. On reprinting after this lapse of time, it ran successfully on several different types of stock. The ink was also highly satisfactory for printing on ordinary "Cellophane."

The pigments which are utilized for the preparation of the inks may be of various types including mineral pigments as well as coal tar derivatives, carbon blacks, lamp blacks and the like, with or without the usual toners. The invention is of particular applicability with respect to the black inks utilizing carbon black or lamp black.

The varnishes used may also be of various types and the solvents utilized in the varnishes may also be drawn from a large class of materials. Among the resinous or film-forming materials which may be dissolved in solvents of various types to produce the varnishes are cellulose nitrate, Celluloid, cellulose acetate, cellulose propionate, the cellulose ethers such as propyl cellulose and butyl cellulose, rosin, mastic, ester gum, pontianak and various synthetic gums and resins such as "Nevillite," "Beckosols," and the like. In some cases, the varnish constituent may comprise merely linseed oil or mixtures of linseed oil or other drying oils with various resinous or film-forming materials such as those listed hereinabove. In general, the varnishes employed should be of the oxidizing type since their use eliminates the employment of drying oils and the like and the emulsion inks prepared from the oxidizing varnishes have superior anti-skinning properties.

The agents which I characterize as colloidal agents are those which appear to have some colloidal or protective colloidal characteristics. While various so-called colloidal agents may be employed, I have found that tannic acid, and polyvinyl alcohol are particularly satisfactory, the polyvinyl alcohol functioning best in inks of heavier body whereas the tannic acid appears to function best in the lighter inks such as those employed for newspaper printing. Other so-called colloidal agents which may be utilized are those having some resinous properties, a notable example being methyl methacrylate resin which is frequently used as a rayon size. I characterize as colloidal agents, of which the three listed are merely representative of a large class, those which have the property of forming dispersions or suspensions in aqueous media rather than forming so-called true molecular solutions.

The emulsifying agents may be any of the usual natural or synthetic products. Of particular utility are the higher molecular weight alkyl sulphates, conventionally denoted as "Gardinols"; the "MPD" products which, it is understood, are sulphonated chlorinated hydrocarbons; and the condensation products of hydroxy alkyl amines and higher molecular weight fatty acids or derivatives of said fatty acids as, for example, esters, acyl halides, and anhydrides. The product identified in various of the examples as "MPD-189" is one of the class of "MPD" agents sold on the market under the indicated name. The condensation products of the hydroxy alkyl amines and higher fatty acids are disclosed in such patents as 2,173,058 and 2,089,212. The numerous synthetic emulsifying, dispersing and wetting agents, sold on the market under various trade names, may be used in accordance with my invention with more or less satisfactory results. The "MPD" products appear to function particularly well and represent a preferred embodiment of my invention.

While I prefer to employ two separate agents, one having colloidal and the other having emulsifying properties, still, in certain instances, a single agent possesses both types of properties so that it may be used in place of the colloidal agent and the emulsifying agent. An illustrative example of this type of substance is the product identified as "Ninol" X in Example 5 hereinabove.

The magnesium carbonate utilized is preferably the product conventionally known in the printing trade as "magnesia." Any other magnesium carbonate product having generally the same properties as the so-called "magnesia" may be employed with satisfactory results.

The proportions of the ingredients entering into the preparation of the inks of my invention are subject to relatively wide variations. In general, in the case of black inks, where the pigment is carbon black, the carbon black may range from about 12% to about 18% by weight of the ink as a whole, the preferred range being from about 14% to about 16%. In colored inks, the pigment may range from about 10% to about 25% of the weight of the ink and in many cases substantially higher percentages may be used. This is particularly so in the case of yellow inks wherein from 60% to 70% of the entire ink is made up of the pigment.

The varnish, as a general rule, comprises from about 40% to about 60% by weight of the entire ink and, in some cases, the proportion may be slightly lower or substantially higher than the indicated range.

The water, in the case of black inks, constitutes from about 10% to about 16% by weight with about 14% to about 16% representing the preferred range. If more than about 16% of water is used in the black inks, at least where carbon black or lamp black comprises the essential pigment, there is a tendency for the water to separate. Lesser amounts of water may be used than the lower range indicated, but the full benefits of the invention are not achieved by going below about 10% of water. In the case of the colored inks, the water content may range from about 10% to about 25% or even slightly higher, from about 18% to about 25% representing the preferred range.

The colloidal agent and the emulsifying agent together comprise about 1% to about 5% of the ink by weight. It will be understood, of course, that the proportions of the emulsifying agent and the colloidal agent will vary depending upon their potency and upon the particular results desired. Where a very potent emulsifying agent is used such as the "MPD" reagents, from about 0.2% to about 0.5% of the active constituent or constituents thereof is sufficient. In this connection, it may be pointed out that, with many emulsifying agents, of which the "MPD's" are an example, the active agent or agents present therein may constitute only a fraction of the composition as a whole sold as the emulsifying agent, the balance being diluent or inactive materials. This fact should, of course, be taken into consideration in determining the proportions to be employed. In the case of the colloidal agent, an average satisfactory proportion is of the order of 1% to 2%. Those skilled in the art will readily be able to select proper proportions, giving consideration to the various factors involved.

The magnesium carbonate may also vary in amount, as a general rule about 3% to about 6% representing a good working range with about 5% being particularly satisfactory in most cases.

It will be understood that various changes may be made in the emulsion ink compositions or in the compounding of the same without departing from the spirit of the invention. It will also be understood that supplemental agents may be employed for obtaining special effects wherever such are desired. These and other variations are all within the scope of my invention as defined in the accompanying claims.

What I claim as new and desire to protect by Letters Patent of the United States is:

1. A black ink of the water-in-oil emulsion type containing the following ingredients in substantially the following precentages by weight:

| | Per cent |
|---|---|
| Varnish | 40 to 60 |
| Water | 10 to 16 |
| Carbon black | 12 to 18 |
| Colloidal agent and emulsifying agent | 1 to 5 |
| Magnesium carbonate | 3 to 6 |

2. A black ink of the water-in-oil emulsion type containing the following ingredients in substantially the following percentages by weight:

| | Per cent |
|---|---|
| Varnish | 40 to 60 |
| Water | 14 to 16 |
| Carbon black | 14 to 16 |
| Colloidal agent and emulsifying agent | 1 to 2 |
| Magnesium carbonate | 5 |

3. A colored water-in-oil emulsion ink containing the following ingredients in substantially the following percentages by weight:

| | Per cent |
|---|---|
| Varnish | 40 to 60 |
| Water | 10 to 25 |
| Pigment | 10 to 30 |
| Colloidal agent and emulsifying agent | 1 to 5 |
| Magnesium carbonate | 3 to 6 |

4. A colored water-in-oil emulsion ink containing the following ingredients in substantially the following percentages by weight:

| | Per cent |
|---|---|
| Varnish | 40 to 60 |
| Water | 10 to 25 |
| Pigment | 10 to 30 |
| Tannic acid and sulphonated chlorinated hydrocarbon | 1 to 5 |
| Magnesium carbonate | 3 to 6 |

5. A black ink of the water-in-oil emulsion type containing the following ingredients in substantially the following percentages by weight:

| | Per cent |
|---|---|
| Varnish | 40 to 60 |
| Water | 10 to 16 |
| Carbon black | 12 to 18 |
| Polyvinyl alcohol and sulphonated chlorinated hydrocarbon | 1 to 5 |
| Magnesium carbonate | 3 to 6 |

6. A black ink of the water-in-oil emulsion type containing the following ingredients in substantially the following percentages by weight:

| | Per cent |
|---|---|
| Varnish | 40 to 60 |
| Water | 14 to 16 |
| Carbon black | 14 to 16 |
| Tannic acid and sulphonated chlorinated hydrocarbon | 1 to 2 |
| Magnesium carbonate | 5 |

7. A colored water-in-oil emulsion ink containing the following ingredients in substantially the following percentages by weight:

| | Per cent |
|---|---|
| Varnish | 40 to 60 |
| Water | 10 to 25 |
| Pigment | 10 to 30 |
| Tannic acid and emulsifying agent | 1 to 5 |
| Magnesium carbonate | 3 to 6 |

8. A colored water-in-oil emulsion ink containing the following ingredients in substantially the following percentages by weight:

| | Per cent |
|---|---|
| Varnish | 40 to 60 |
| Water | 10 to 25 |
| Pigment | 10 to 30 |
| Polyvinyl alcohol and emulsifying agent | 1 to 5 |
| Magnesium carbonate | 3 to 6 |

9. A black ink of the water-in-oil emulsion type containing the following ingredients in substantially the following percentages by weight:

| | Per cent |
|---|---|
| Varnish | 40 to 60 |
| Water | 10 to 16 |
| Carbon black | 12 to 18 |
| Polyvinyl alcohol and emulsifying agent | 1 to 5 |
| Magnesium carbonate | 3 to 6 |

10. A colored water-in-oil emulsion ink containing the following ingredients in substantially the following percentages by weight:

| | Per cent |
|---|---|
| Varnish | 40 to 60 |
| Water | 10 to 25 |
| Pigment | 10 to 30 |
| Methacrylate resin and emulsifying agent | 1 to 5 |
| Magnesium carbonate | 3 to 6 |

11. A black ink of the water-in-oil emulsion type containing the following ingredients in substantially the following percentages by weight:

| | Per cent |
|---|---|
| Varnish | 40 to 60 |
| Water | 10 to 16 |
| Carbon black | 12 to 18 |
| Methacrylate resin and emulsifying agent | 1 to 5 |
| Magnesium carbonate | 3 to 6 |

JAMES RAYMOND BERG.